United States Patent
Holley

(10) Patent No.: US 11,898,430 B2
(45) Date of Patent: Feb. 13, 2024

(54) ADJUSTING WELLBORE OPERATIONS IN TARGET WELLBORE USING TRAINED MODEL FROM REFERENCE WELLBORE

(71) Applicant: Halliburton Energy Services, Inc., Houston, TX (US)

(72) Inventor: Eric Howard Holley, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 87 days.

(21) Appl. No.: 17/318,638

(22) Filed: May 12, 2021

(65) Prior Publication Data
US 2022/0364450 A1 Nov. 17, 2022

(51) Int. Cl.
E21B 43/26 (2006.01)
E21B 43/267 (2006.01)
E21B 47/113 (2012.01)
G06N 20/00 (2019.01)
E21B 47/06 (2012.01)
E21B 49/00 (2006.01)
G01V 3/38 (2006.01)

(52) U.S. Cl.
CPC ........ *E21B 43/267* (2013.01); *E21B 43/2607* (2020.05); *E21B 47/06* (2013.01); *E21B 47/113* (2020.05); *E21B 49/00* (2013.01); *G01V 3/38* (2013.01); *G06N 20/00* (2019.01)

(58) Field of Classification Search
CPC .... E21B 43/267; E21B 43/2607; E21B 47/06; E21B 47/113; E21B 49/00; E21B 2200/20; G01V 3/38; G01V 1/226; G06N 20/00
See application file for complete search history.

(56) References Cited

U.S. PATENT DOCUMENTS

| 10,677,036 B2 | 6/2020 | Stolyarov et al. | |
| 2016/0115771 A1* | 4/2016 | Ganguly | E21B 43/25 |
| 2019/0145233 A1* | 5/2019 | Karale | |
| 2020/0248540 A1* | 8/2020 | Madasu | E21B 43/16 |
| 2021/0131261 A1* | 5/2021 | Wang | E21B 49/006 |

OTHER PUBLICATIONS

Halliburton Energy Services, Inc, "SmartFleet Intelligent Fracturing System Data Sheet", 2021, 2 pages.

* cited by examiner

Primary Examiner — Catherine T. Rastovski
Assistant Examiner — Lal C Mang
(74) Attorney, Agent, or Firm — Kilpatrick Townsend & Stockton LLP

(57) ABSTRACT

A system can receive data that can indicate a flow rate with respect to perforations in a reference wellbore. The data can be received from a fiber optic cable in the reference wellbore in a geographic area of interest. The system can determine a uniformity index, which can indicate a uniformity of flow with respect to the perforations, based on the data. The system can generate a pressure-based model by training a model using the uniformity index for applying the pressure-based model to a target wellbore in the geographic area of interest to determine controls to rate and proppant with respect to the target wellbore.

14 Claims, 4 Drawing Sheets

ADJUSTING WELLBORE OPERATIONS IN TARGET WELLBORE USING TRAINED MODEL FROM REFERENCE WELLBORE

TECHNICAL FIELD

The present disclosure relates generally to calibrating or adjusting wellbore operations and, more particularly (although not necessarily exclusively), to adjusting target wellbore operations using a pressure-based model trained with respect to a reference wellbore.

BACKGROUND

A wellbore can be formed in a subterranean formation or a sub-oceanic formation for extracting produced hydrocarbon material. The wellbore can be one of a set of wellbores within a geographic area of interest. Wellbore operations, such as completion operations, can be performed with respect to the wellbore. For example, a hydraulic fracturing operation can be performed with respect to the wellbore for extracting the produced hydrocarbon material. The wellbore operations can be characterized by parameters such as pressure, flow rate, and the like. The parameters can be measured using a fiber optic cable that can be positioned in the wellbore. But, running the fiber optic cable in the wellbore can be expensive and time-consuming to perform for each wellbore included in the geographic area of interest.

DETAILED DESCRIPTION

Figure 1:
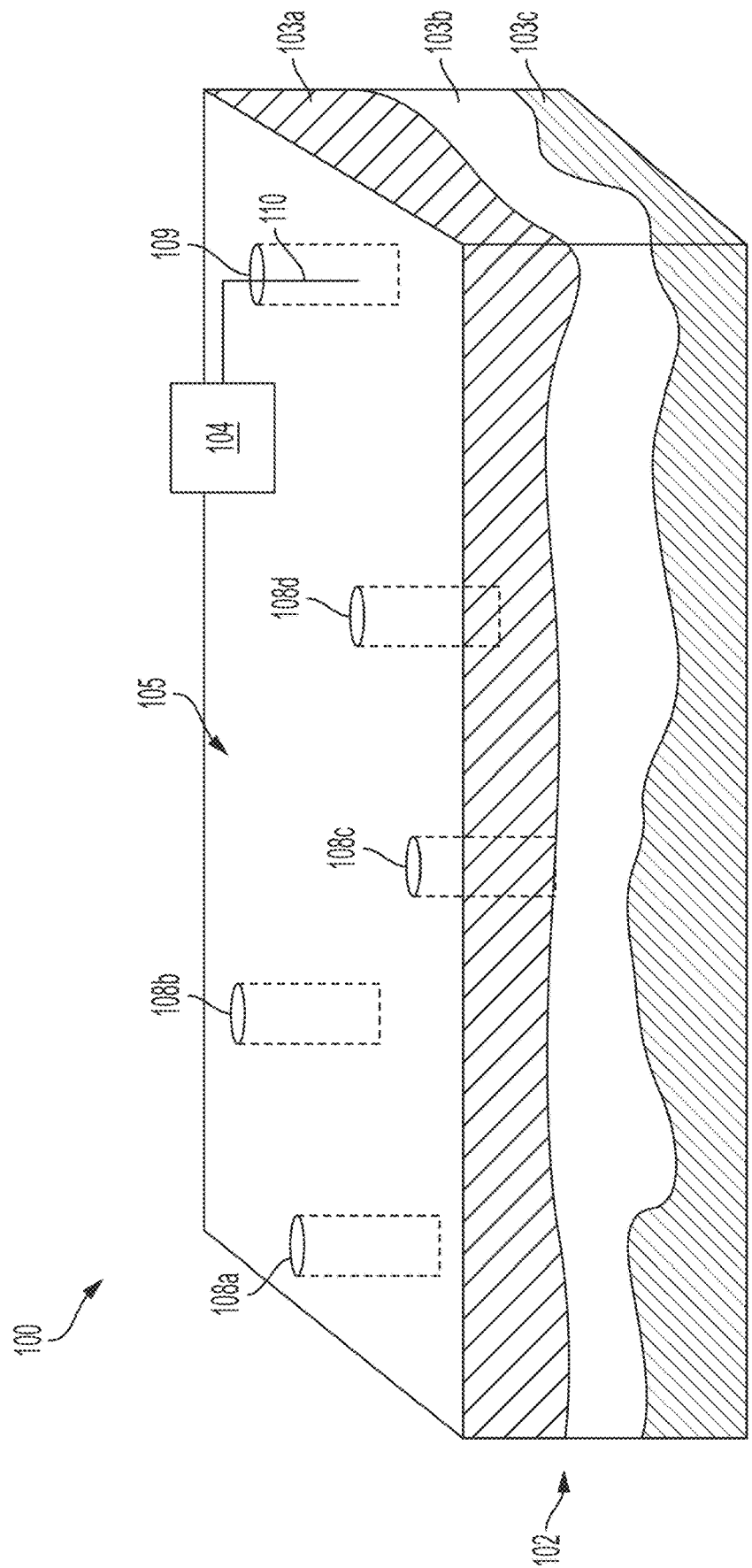
FIG. 1 is a perspective view of a geographic area of interest that includes a reference wellbore and a set of target wellbores according to one example of the present disclosure.

Certain aspects and examples of the present disclosure relate to generating a pressure and rate-based model using fiber optic data from a reference wellbore and applying the pressure and rate-based model to a target wellbore to output commands for adjusting completion operations with respect to the target wellbore. The target wellbore can be positioned proximate to the reference wellbore within a geographic area of interest. The pressure-based model can include a machine-learning model that can be trained using a uniformity index that can be determined based on the fiber optic data. The uniformity index can represent a uniformity of injection flow and proppant rates among perforations in the reference wellbore. The pressure and rate-based model can be applied to the target wellbore to estimate a uniformity index of the target wellbore. The estimated uniformity index can be determined based on data about the target wellbore that is detected without the fiber optic cable. For example, the estimated uniformity index can be determined using a detected pressure and rate in the target wellbore and other suitable measurements. The estimated uniformity index can be used to generate and output one or more commands for adjusting a completion operation with respect to the target wellbore. For example, a computing device can apply the pressure-based model to data about the target wellbore to estimate the uniformity index of the target wellbore and can output one or more commands for adjusting a pump-rate, a proppant type and amount, perforation or other suitable parameters of the completion operation based on the estimated uniformity index.

In some examples, calibration can be performed with respect to offset well information from the fiber optic data. The offset well information can include pressure, pump-rate, and other suitable offset well information. The offset well information can be calibrated for determining automated actions to take with respect to one or more target wells. For example, calibrated offset well information can be used to determine one or more commands to apply to equipment used with respect to the target well. In some examples, the calibrated automated actions can be applied automatically to the equipment of the target well.

Automated decision-making can be used with respect to target wellbore operations based on subsurface outcomes using fiber optics. The automated decision-making can be applied to non-fiber wells, which can include wellbores that do not use a fiber optic cable for measuring downhole conditions relating to wellbore operations. A pressure and rate-based model can estimate results of a reference wellbore that uses the fiber optic cable. The reference wellbore can be used to calibrate automated models, such as pump-rate models, proppant models, etc., for a specific formation or geographic area of interest. The calibrated models can be applied to target wellbores that do not use the fiber optic cable, and the target wellbores can be proximate to the reference well in geographic area of interest.

The fiber optic cable can be positioned in the reference well that is positioned in a geographic area of interest, and the fiber optic cable can detect or otherwise receive data relating to downhole conditions during wellbore operations such as hydraulic fracturing. The fiber optic cable can be used to calibrate the automated models such as a pump-rate model, a uniformity index pressure model, a proppant model, or other suitable model. The calibrated models can then be applied to one or more target wellbores in the geographic area of interest. For example, each geographic area of interest can include one reference wellbore and a set of target wellbores. The calibrated models can be used to output control commands for pump-rate, proppant control, and other suitable parameters for various wellbore operations. In some examples, calibrating the automated models using a reference well and applying the calibrated models to non-fiber wells can reduce cost associated with forming the target wellbore.

A fiber optic cable, or a permanent fiber, can be deployed in a wellbore to calibrate the automated models, uniformity index measurements based on pressure, and other suitable offset well measurements. The uniformity index can indicate a uniformity of flow among perforations in the wellbore. Inputs for pump-rate models and proppant models can be used to calibrate a pressure-based uniformity index calculator and a perforation recommendation tool. The wellbore, which can be a calibration wellbore or other type of reference wellbore, can be used to understand how to manage control of a pump-rate controller, proppant controller, or other suitable controller under conditions of injecting fluid or slurry in the wellbore. Various perforation designs can be used to calibrate the pressure-based model. The calibration can be done for each target zone or each geographic area of interest.

For a non-fiber wellbore, which can be a target wellbore, the pressure-based pump-rate models and proppant models can be used to control wellbore operations such as hydraulic fracturing in real-time. An optimal perforation design can be provided by the pressure-based models to provide an optimal uniformity index. The optimal perforation design may reduce fluid-volume pumped, may increase stage length, may improve fracture placement in the subsurface and may reduce total pump time on location at one or more target wellbores. Personnel associated with the target wellbore can determine measurements or parameters associated with the wellbore operations such as pounds per foot (kilograms per meter), a minimum fluid loading in barrel per foot (barrel per meter), and a target flow rate per cluster. And, the pressure-based models can determine the perforation design, the pump-rate control, and the proppant control. In some examples, the pressure-based models can include wellbore-specific data such as gamma ray measurements and other suitable wellbore-specific data. The additional data can cause the perforation design to be updated as the wellbore operations are performed.

One or more pressure-based models can be used to calibrate the automated models. A computing device can use data about a reference wellbore to determine a uniformity index with respect to the reference wellbore. The uniformity index, which can indicate a uniformity of flow among perforations in the reference wellbore, can be used to train the pressure-based model. For example, the computing device can train the pressure-based model to map input data about the reference wellbore, such as pressure, to the determined uniformity index. The computing device can subsequently apply the trained pressure-based model to a target wellbore to estimate a uniformity index with respect to the target wellbore. The computing device can use the estimated uniformity index as input into various calibrated or automated models such as a pump-rate model, a diverter model, a proppant model, and the like. The computing device can use the pump-rate model to output commands adjusting a pump-rate of wellbore operations with respect to the target wellbore. And, the computing device can use the proppant model to output commands adjusting proppant with respect to wellbore operations of the target wellbore. In some examples, the computing device can automatically input the estimated uniformity index into the various calibrated or automated models, each of which can output commands for adjusting or controlling the completion operation. The computing device can automatically apply the output commands to equipment of the completion operation.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a perspective view of a geographic area of interest 100 that includes a reference wellbore 109 and a set of target wellbores 108a-d according to one example of the present disclosure. The geographic area of interest 100 can include a subterranean formation 102 in which the target wellbores 108 and the reference wellbore 109 are disposed or otherwise formed. The subterranean formation 102 may include a set of layers 103a-c that can include various rock formations, subterranean reservoirs, and other suitable components of subterranean formations. The reference wellbore 109 and the target wellbores 108 may be formed in the subterranean formation 102 for extracting various materials such as water, oil, or various gases. Other suitable hydrocarbon materials can additionally be extracted using the reference wellbore 109 or the target wellbores 108.

As illustrated, the geographic area of interest 100 includes four target wellbores 108a-d, but other suitable amounts of target wellbores 108 can be included in the geographic area of interest 100. The reference wellbore 109 and the target wellbores 108 may each be completed in which drilling operations with respect to the reference wellbore 109 and the target wellbores 108 have been performed. The reference wellbore 109 and the target wellbores 108 may each include a set of perforation clusters. A perforation cluster can be a group of two or more perforations in casings of the reference wellbore 109 or the target wellbores 108. The perforations can allow material to flow between the subterranean formation 102 and the reference wellbore 109 or the target wellbores 108. Perforations can be grouped into perforation clusters at corresponding stages of the reference wellbore 109 or the target wellbores 108 in which each stage can correspond to a completion operation.

Completion operations may be performed with respect to the reference wellbore 109 and to the target wellbores 108. Completion operations can include suitable operations for stimulating hydrocarbon production such as hydraulic fracturing. The completion operations can involve forming perforations in one or more casings of the reference wellbore 109 or target wellbores 108. The perforations can allow fluid or other material to flow from the reference wellbore 109 or the target wellbores 108 into the subterranean formation 102. For example, water can be injected into the reference wellbore 109 or into the target wellbores 108 for inducing hydraulic fractures. Additionally or alternatively, proppant can be injected into the reference wellbore 109 or into the target wellbores 108 for maintaining the induced hydraulic fractures during the completion operations or during production operations.

The completion operations can be characterized by various parameters and downhole conditions. Some examples of completion operation parameters and downhole conditions can include pressure, pump-rate, proppant flow and amount, perforation flow-rate, fluid per foot (fluid per meter) and other suitable completion operation parameters and downhole conditions. The downhole conditions can influence performance of the completion operations. For example, if the downhole conditions are optimal, then the completion operations may be performed efficiently with intended or otherwise positive results. The downhole conditions can be measured by a fiber optic cable 110 that can be disposed or otherwise deployed in the reference wellbore 109. In some examples, the fiber optic cable 110 can be deployed in intervals or stages within the reference wellbore 109.

A computing device 104 can be disposed at the surface 105 of the subterranean formation 102. The computing device 104 can be communicatively coupled to the fiber optic cable 110 for measuring or receiving data from the reference wellbore 109 such as completion operation parameters. The computing device 104 can include a processor and a memory that can store processor-executable instructions for performing various operations with respect to the reference wellbore 109 and the target wellbores 108. For example, the computing device 104 can generate a pressure-based model based on a uniformity index or other results determined from received data about the reference wellbore 109. Additionally, the computing device 104 can apply the pressure and rate-based model to one or more target wellbores 108 to determine an estimated uniformity index with respect to the target wellbores 108 without deploying the fiber optic cable 110 in the target wellbores 108. In some examples, the computing device 104 can, in response to applying the pressure-based model to data about the target wellbores 108, output one or more commands for adjusting the completion operations with respect to the target wellbores 108. In these examples, the commands may optimize or otherwise improve completion operations performed with respect to the target wellbores 108. The completion operations can be optimized or otherwise improved without deploying the fiber optic cable 110 in the target wellbores 108 by using the pressure-based model. For example, the pressure-based model can be used to control rate and proppant in the target wellbore 108 without any fiber optic cable 110 being present in the target wellbore 108.

Figure 2:
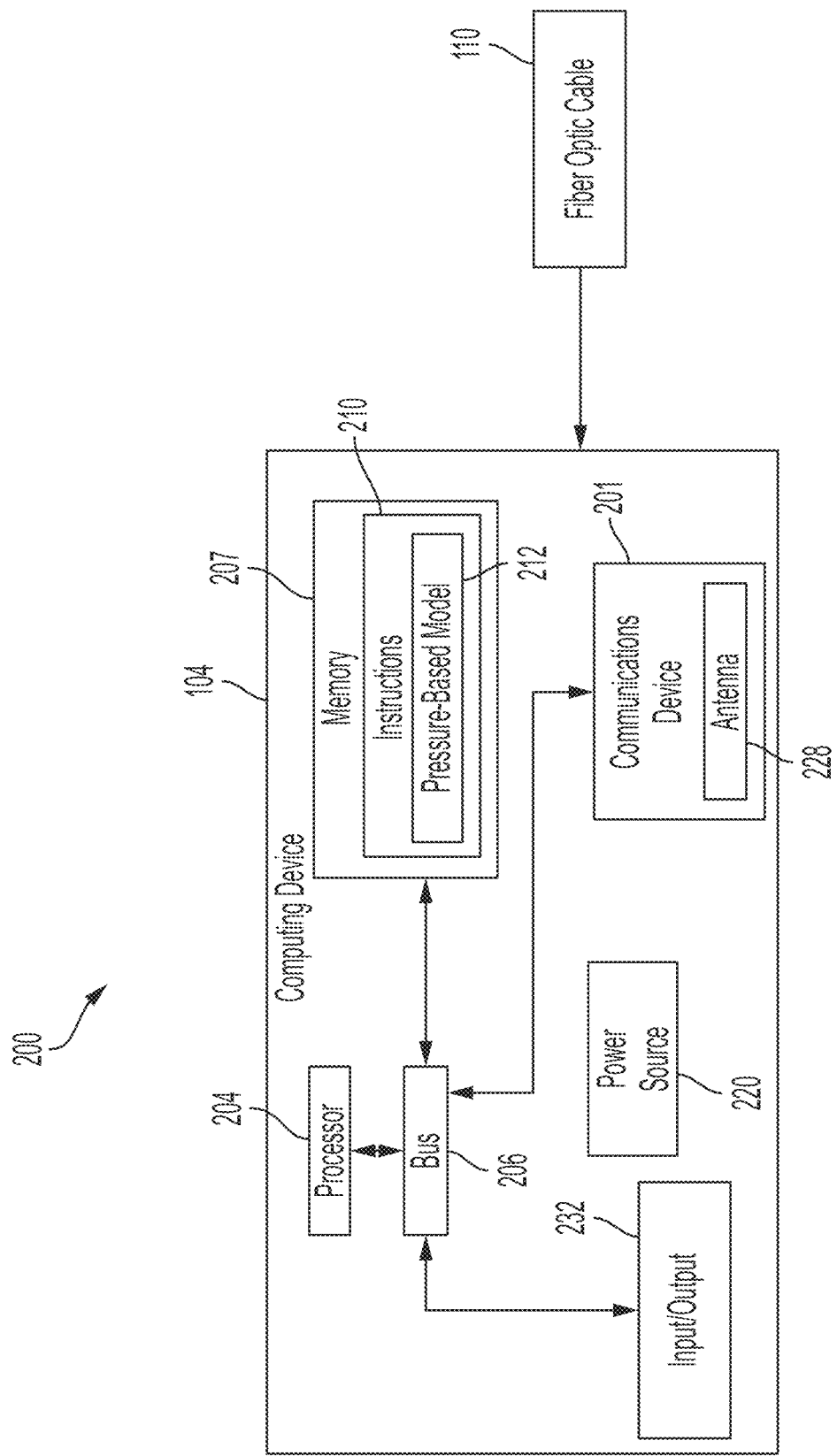
FIG. 2 is a block diagram of a computing system for generating a pressure-based model with respect to a reference wellbore and applying the pressure-based model to data about a target wellbore for outputting a command to adjust a completion operation with respect to the target wellbore according to some examples of the present disclosure.

FIG. 2 is a block diagram of a computing system 200 for generating a pressure and rate-based model with respect to a reference wellbore 109 and applying the pressure and rate-based model to data about a target wellbore 108 for outputting a command to adjust a completion operation with respect to the target wellbore 108 according to some examples of the present disclosure. The components shown in FIG. 2, such as the processor 204, memory 207, power source 220, and communications device 201, may be integrated into a single structure, such as within a single housing of a computing device 104. Alternatively, the components shown in FIG. 2 can be distributed from one another and in electrical communication with each other.

The computing system 200 may include the computing device 104. The computing device 104 can include a processor 204, a memory 207, and a bus 206. The processor 204 can execute one or more operations for generating and applying a pressure-based model 212 to data from a target wellbore 108 to output commands for adjusting completion operations with respect to the target wellbore 108. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The non-volatile memory 207 may include any type of memory device that retains stored information when powered off. Non-limiting examples of the memory 207 may include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 207 can include computer program instructions 210 for generating and applying the pressure-based model 212. For example, the instructions 210 can include the pressure-based model 212 that is executable by the processor 204 for causing the processor 204 to output commands for adjusting completion operations with respect to the target wellbore 108. The pressure-based model 212 can include a machine-learning model that can be trained using data from a reference wellbore 109. For example, the computing device 104 can receive data indicating downhole conditions in the reference wellbore 109 from a fiber optic cable 110 that is communicatively coupled to the computing device 104 and disposed in the reference wellbore 109. The computing device 104 can use the data to determine a uniformity index with respect to the reference wellbore 109. The computing device can train the pressure-based model using the uniformity index.

The computing device 104 can include a power source 220. The power source 220 can be in electrical communication with the computing device 104 and the communications device 201. In some examples, the power source 220 can include a battery or an electrical cable (e.g., a wireline). The power source 220 can include an AC signal generator. The computing device 140 can operate the power source 220 to apply a transmission signal to the antenna 228 to generate electromagnetic waves that convey data relating to the reference wellbore 109, the target wellbore 108, the pressure-based model 212, etc. to other systems. For example, the computing device 104 can cause the power source 220 to apply a voltage with a frequency within a specific frequency range to the antenna 228. This can cause the antenna 228 to generate a wireless transmission. In other examples, the computing device 104, rather than the power source 220, can apply the transmission signal to the antenna 228 for generating the wireless transmission.

In some examples, part of the communications device 201 can be implemented in software. For example, the communications device 201 can include additional instructions stored in memory 207 for controlling functions of the communication device 201. The communications device 201 can receive signals from remote devices and transmit data to remote devices. For example, the communications device 201 can transmit wireless communications that are modulated by data via the antenna 228. In some examples, the communications device 201 can receive signals (e.g. associated with data to be transmitted) from the processor 204 and amplify, filter, modulate, frequency shift, or otherwise manipulate the signals. In some examples, the communications device 201 can transmit the manipulated signals to the antenna 228. The antenna 228 can receive the manipulated signals and responsively generate wireless communications that carry the data.

The computing device 104 can additionally include an input/output interface 232. The input/output interface 232 can connect to a keyboard, pointing device, display, and other computer input/output devices. An operator may provide input using the input/output interface 232. Data relating to one or more completion operations with respect to the reference wellbore 109 or the target wellbore 108 can be displayed to an operator of the target wellbore 108 through a display that is connected to or is part of the input/output interface 232. The displayed values can be observed by the operator, or by a supervisor of the target wellbore 108, who can make adjustments to the completion operations based on the displayed values. Alternatively, the computing device 104 can, instead of displaying the values, automatically control or adjust the completion operations based on a determined, estimated uniformity index of the target wellbore 108.

Figure 3:
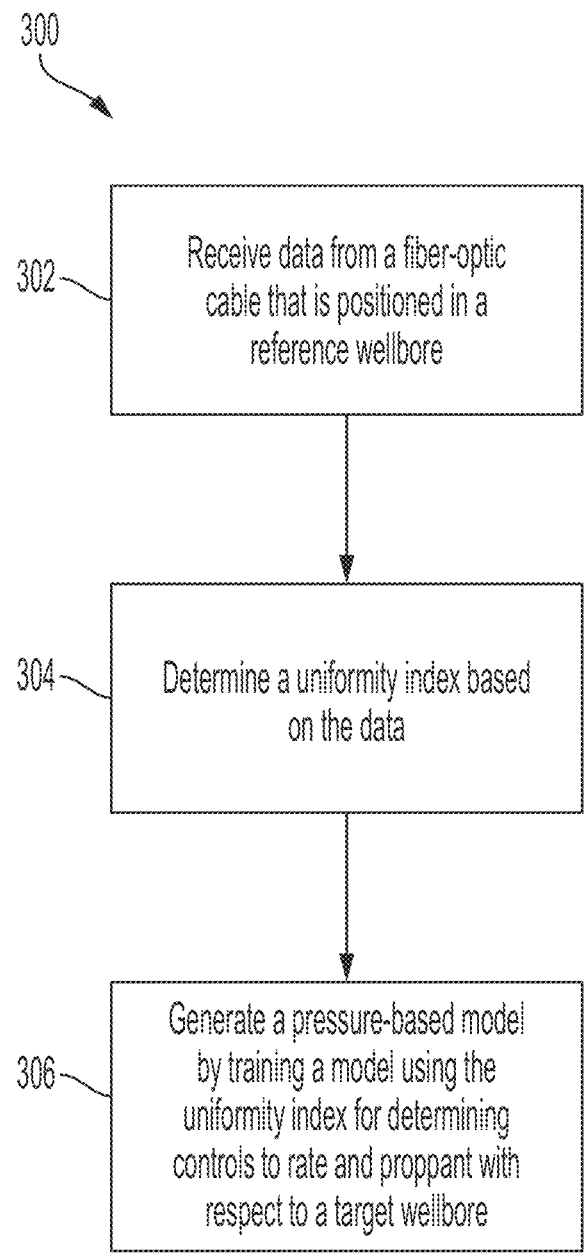
FIG. 3 is a flow chart of a process for generating a pressure-based model for determining controls to rate and proppant with respect to a target wellbore in a geographic area of interest according to one example of the present disclosure.

FIG. 3 is a flow chart of a process 300 for generating a pressure-based model 212 for determining controls to rate and proppant with respect to a target wellbore 108 in the geographic area of interest 100 according to one example of the present disclosure. At block 302, the computing device 104 receives data from a fiber optic cable 110 that is positioned in a reference wellbore 109. The data can include indications of downhole conditions such as pressure and flow rate in the reference wellbore 109. In some examples, the fiber optic cable 110 can detect data that includes a pump rate of the reference wellbore 109 and a pressure of the reference wellbore 109. The data can include a flow rate per perforation or perforation cluster in the reference wellbore 109.

At block 304, the computing device 104 determines a uniformity index based on the data. A uniformity index can indicate a uniformity of flow among the perforations of one or more perforation clusters in the reference wellbore 109. The reference wellbore 109 can include a set of perforation clusters that can each include a set of perforations. A perforation cluster can be grouped such that a hydraulic fracturing operation can be performed with respect to the perforation cluster. In some examples, the uniformity index can be determined by the computing device 104 by performing the following operation:

$$UI = 1 - \frac{\sigma}{\mu} \quad (1)$$

in which UI is the uniformity index, σ is a standard deviation and μ is an average. The standard deviation can be determined by calculating the positive square root of a variance of flow rates, and the average can be an average of the flow rates. The flow rates can be flow rates of the reference wellbore 109 or a subset thereof such as flow rates for one perforation cluster in the reference wellbore 109. The uniformity index can be determined for each perforation cluster of the set of perforation clusters included in the reference wellbore 109. In some examples, one uniformity index can be determined for the reference wellbore 109 based on flow rates of the perforations of the reference wellbore 109.

At block 306, the computing device 104 generates a pressure-based model 212 by training a model using the uniformity index for determining controls to pump-rate and proppant with respect to a target wellbore 108. The pressure-based model 212 can be a machine-learning model. The pressure-based model can be trained for each perforation cluster in the reference wellbore 109. For example, each perforation cluster in the reference wellbore 109 can include a respective set of perforations and the computing device 104 can determine a uniformity index associated with the respective perforation cluster. In some examples, the pressure-based model can be trained for each stage of a set of stages with respect to the reference wellbore 109 in which each stage includes one or more perforation clusters. The computing device 104 can use the associated uniformity index to train the pressure-based model 212. Alternatively, the computing device 104 can determine one uniformity index for the reference wellbore 109 using perforations contained in the reference wellbore 109. The one uniformity index can be used to train the pressure-based model 212. The trained pressure-based model 212 can be used to estimate a uniformity index with respect to the target wellbore 108 for determining controls to pump-rate and proppant for wellbore operations associated with the target wellbore 108.

Figure 4:
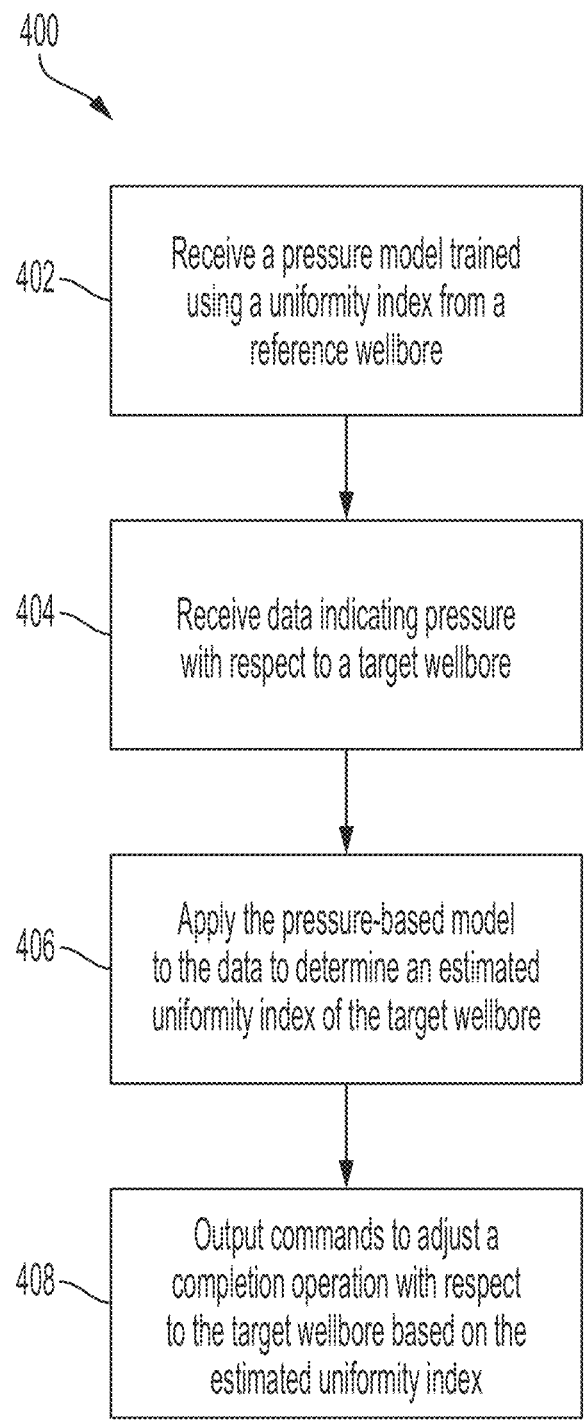
FIG. 4 is a flow chart of a process for outputting a command to adjust a completion operation with respect to a target wellbore according to one example of the present disclosure.

FIG. 4 is a flow chart of a process 400 for outputting a command to adjust a completion operation with respect to a target wellbore 108 according to one example of the present disclosure. At block 402, the computing device 104 receives a pressure-based model 212 that is trained using a uniformity index from a reference wellbore 109. The uniformity index can be the combined uniformity index described with respect to the block 306 of the process 300.

The pressure-based model 212 can include a pump-rate model, a proppant model, and other suitable models for controlling the completion operation. The pump-rate model can control a pump rate of the completion operation and the proppant model can control a sand mixture, or other proppant type, used in the completion operation. In some examples, the pressure-based model 212 can correlate pressure and uniformity index in the reference wellbore 109, the target wellbore 108, a combination thereof, or other suitable wellbore.

At block 404, the computing device 104 receives data indicating pressure with respect to the target wellbore 108. The data can be detected by sensors that do not include fiber optics. The data can indicate pressure at various locations within the target wellbore 108. For example, the data can indicate pressure with respect to perforation clusters in the target wellbore 108. Additionally or alternatively, the data can indicate wellbore-related conditions such as a wellbore geometry, proppant characteristics, treatment pressure, a surface sand concentration, a slurry rate, a maximum sand concentration, or other suitable wellbore-related conditions. The data may not include or otherwise indicate flow rates with respect to perforations in the target wellbore 108.

At block 406, the computing device 104 applies the pressure-based model 212 to the data to determine an estimated uniformity index of the target wellbore 108. The pressure-based model 212 can map input data, such as the data indicating pressure in the target wellbore 108, to outputs such as the estimated uniformity index. The estimated uniformity index can represent an estimated uniformity of flow rates with respect to perforations contained in the target wellbore 108. Alternatively, the pressure-based model 212 can output or otherwise determine the estimated uniformity index for each perforation cluster included in the target wellbore 108.

At block 408, the computing device 104 outputs one or more commands to adjust a completion operation with respect to the target wellbore 108 based on the estimated uniformity index. The commands can be generated and output based on the estimated uniformity index with respect to perforations of the target wellbore 108. In some examples, the commands can be generated and automatically applied to equipment with respect to the completion operation. In examples in which the pressure-based model 212 outputs the estimated uniformity index for each perforation cluster, the commands can be generated and output for each perforation cluster included in the target wellbore 108. The commands can be used by the computing device 104 to adjust parameters of the completion operation. For example, the computing device 104 can adjust a pump-rate or an amount or type of proppant associated with the completion operation using a pump-rate model, a proppant model, or a diverter model.

The pump-rate model can include a fast pump-rate model, a slow pump-rate model, or other suitable pump-rate models. The fast pump-rate model can take a pump-rate command generated by the pressure-based model 212 and ramp-up pumps in series or parallel based on a predetermined ramp rate associated with the completion operation. The slow pump-rate model can take a pump-rate command generated by the pressure-based model 212 and perform various calculations. The calculations can include determining a slope that can represent a ramp rate of pumps associated with the completion operation based on the pump-rate command. The slope can include units of psi/min $$\left(\frac{N}{m^2 * \min}\right)$$

and can determine how quickly the pumps associated with the completion operation ramp to the pump-rate command.

The proppant model can include a sand ramp model, or other suitable proppant model. The proppant model can take a proppant control command generated by the pressure-based model 212 and can determine a proppant ramp, a maximum proppant concentration, and other suitable proppant-related operations. The proppant ramp can be a rate at which proppant or proppant concentration is increased in the target wellbore 108. The maximum concentration can indicate a maximum allowable percentage of proppant in material injected into the target wellbore 108. The proppant model can additionally execute a sand concentration schedule which can be a set of operations for initially adjusting proppant in the target wellbore 108.

The diverter model can include a diversion control that can determine or otherwise control a decrease in proppant or proppant concentration in the target wellbore 108. Additionally or alternatively, the diverter model can determine whether a diverter material can be deployed, when to deploy the diverter material, and an associated pump rate. The diverter model can additionally perform other suitable operations associated with the diverter material.

The computing device 104 can additionally output a command for adjusting a perforation recommendation model. In some examples, the perforation recommendation model can be included in the pressure-based model 212. The perforation recommendation model can determine optimal perforation amounts, sizes, arrangements, and the like in the target wellbore 108. The perforation recommendation model can take as input data from the fiber optic cable 110 and output recommendations for optimized arrangements of perforations and perforation clusters. The computing device 104 can receive the recommendations and automatically input the recommendations into equipment associated with the completion operation for forming the perforations or clusters of perforations in the target wellbore 108.

In some aspects, devices, well tools, and methods for adjusting a completion operation with respect to a target wellbore using a model trained using data from a reference wellbore are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving data from a fiber optic cable in a reference wellbore in a geographic area of interest, the data indicating a flow rate with respect to a plurality of perforations in the reference wellbore; determining a uniformity index based on the data, the uniformity index indicating a uniformity of flow with respect to the plurality of perforations; and generating a pressure-based model by training a model using the uniformity index for applying the pressure-based model to a target wellbore in the geographic area of interest to determine controls to rate and proppant with respect to the target wellbore.

Example 2 is the system of example 1, wherein the data includes a pump rate of the reference wellbore and a pressure of the reference wellbore usable for determining a flow distribution of the reference wellbore, and wherein the operation of determining the uniformity index based on the data includes using a coefficient of variation that is a standard deviation of the flow distribution of the reference wellbore divided by a mean of the flow distribution in the reference wellbore.

Example 3 is the system of any of examples 1-2, wherein the pressure-based model is usable for controlling rate and proppant in the target wellbore without any fiber optic cable being present in the target wellbore.

Example 4 is the system of example 1, wherein the reference wellbore includes a plurality of perforation clusters, and wherein the operation of determining the uniformity index based on the data includes determining the uniformity index for the plurality of perforation clusters.

Example 5 is the system of any of examples 1 and 4, wherein a standard deviation of the plurality of perforation clusters is a positive square root of a variance of a plurality of flow rates associated with the plurality of perforation clusters.

Example 6 is the system of any of examples 1 and 4-5, wherein the standard deviation of the plurality of perforation clusters is usable to determine the uniformity index for the plurality of perforation clusters, and wherein the operation of generating the pressure-based model includes training the pressure-based model using the uniformity index for the plurality of perforation clusters.

Example 7 is the system of example 1, wherein the pressure-based model includes a pump-rate model or a proppant model, wherein a pump rate of a completion operation is controllable by the pump-rate model, and wherein a sand mixture used in the completion operation is controllable by the proppant model.

Example 8 is a method comprising: receiving, by a computing device, a pressure-based model trained using a uniformity index based on data received from a fiber optic cable in a reference wellbore in a geographic area of interest; receiving, by the computing device, data indicating pressure with respect to a target wellbore in the geographic area of interest; applying, by the computing device, the pressure-based model to the data to determine an estimated uniformity index of the target wellbore; and outputting, by the computing device, commands to adjust a completion operation with respect to the target wellbore based on the estimated uniformity index.

Example 9 is the method of example 8, wherein the data received from the fiber optic cable includes flow rates per perforation cluster of a plurality of perforation clusters in the reference wellbore, and wherein the pressure-based model correlates the uniformity index of the reference wellbore a pressure of the reference wellbore.

Example 10 is the method of example 8, wherein applying the pressure-based model to the data to determine the estimated uniformity index of the target wellbore includes determining the estimated uniformity index of the target wellbore without any fiber optic cable being present in the target wellbore.

Example 11 is the method of example 8, wherein outputting commands to adjust the completion operation with respect to the target wellbore based on the estimated uniformity index includes determining a pump rate of the completion operation and a proppant of the completion operation.

Example 12 is the method of any of examples 8 and 11, wherein the target wellbore includes a plurality of perforation clusters, and wherein applying the pressure-based model to the data to determine the estimated uniformity index of the target wellbore includes determining the estimated uniformity index for the plurality of perforation clusters.

Example 13 is the method of any of examples 8 and 11-12, wherein outputting commands to adjust the completion operation with respect to the target wellbore includes generating the commands based on the estimated uniformity index for the plurality of perforation clusters.

Example 14 is the method of example 8, wherein the pressure-based model includes a pump-rate model, a diverter model, or a proppant model, wherein a pump rate of a completion operation is controllable by the pump-rate model, wherein an amount of diverter to drop with respect to the completion operation is controllable by the diverter model, and wherein a sand mixture used in the completion operation is controllable by the proppant model.

Example 15 is a non-transitory computer-readable medium comprising instructions that are executable by a processing device for causing the processing device to perform operations comprising: receiving data from a fiber optic cable in a reference wellbore in a geographic area of interest, the data indicating a flow rate with respect to a plurality of perforations in the reference wellbore; determining a uniformity index based on the data, the uniformity index indicating a uniformity of flow with respect to the plurality of perforations; generating a pressure-based model by training a model using the uniformity index for applying the pressure-based model to a target wellbore in the geographic area of interest; receiving data indicating pressure with respect to the target wellbore in the geographic area of interest; applying the pressure-based model to the data indicating pressure with respect to the target wellbore to determine an estimated uniformity index of the target wellbore; and outputting commands to adjust a completion operation with respect to the target wellbore based on the estimated uniformity index.

Example 16 is the non-transitory computer-readable medium of example 15, wherein the data from the fiber optic cable includes a pump rate of the reference wellbore and a pressure of the reference wellbore usable for determining a flow distribution of the reference wellbore, and wherein the operation of determining the uniformity index based on the data from the fiber optic cable includes using a coefficient of variation that is a standard deviation of the flow distribution of the reference wellbore divided by a mean of the flow distribution in the reference wellbore.

Example 17 is the non-transitory computer-readable medium of any of examples 15-16, wherein the pressure-based model is usable for controlling rate and proppant in the target wellbore without any fiber optic cable being present in the target wellbore.

Example 18 is the non-transitory computer-readable medium of example 15, wherein the reference wellbore includes a plurality of perforation clusters, wherein the operation of determining the uniformity index based on the data from the fiber optic cable includes determining the uniformity index for the plurality of perforation clusters, and wherein the operation of generating the pressure-based model includes training the pressure-based model using the uniformity index for the plurality of perforation clusters.

Example 19 is the non-transitory computer-readable medium of any of examples 15 and 18, wherein the operation of outputting commands to adjust the completion operation with respect to the target wellbore includes generating the commands based on the estimated uniformity index for the plurality of perforation clusters.

Example 20 is the non-transitory computer-readable medium of example 15, wherein the pressure-based model includes a pump-rate model or a proppant model, wherein a pump rate of a completion operation is controllable by the pump-rate model, and wherein a sand mixture used in the completion operation is controllable by the proppant model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
receiving, by a computing device, a pressure-based model trained using a uniformity index based on data received from a fiber optic cable in a reference wellbore in a geographic area of interest, wherein the uniformity index is determined for each perforation cluster of a plurality of perforation clusters of the reference wellbore, wherein the uniformity index indicates a uniformity of flow for each perforation of each perforation cluster of the plurality of perforation clusters with respect to other perforation clusters included in the plurality of perforation clusters;
receiving, by the computing device, data indicating pressure with respect to a target wellbore in the geographic area of interest;
applying, by the computing device, the pressure-based model to the data to determine an estimated uniformity index of the target wellbore; and
outputting, by the computing device, commands to adjust a completion operation with respect to the target wellbore based on the estimated uniformity index.

2. The method of claim 1, wherein the data received from the fiber optic cable includes flow rates per perforation cluster of a plurality of perforation clusters in the reference wellbore, and wherein the pressure-based model correlates the uniformity index of the reference wellbore a pressure of the reference wellbore.

3. The method of claim 1, wherein applying the pressure-based model to the data to determine the estimated uniformity index of the target wellbore includes determining the estimated uniformity index of the target wellbore without any fiber optic cable being present in the target wellbore.

4. The method of claim 1, wherein outputting commands to adjust the completion operation with respect to the target wellbore based on the estimated uniformity index includes determining a pump rate of the completion operation and a proppant of the completion operation.

5. The method of claim 4, wherein the target wellbore includes a second plurality of perforation clusters, and wherein applying the pressure-based model to the data to determine the estimated uniformity index of the target wellbore includes determining the estimated uniformity index for the second plurality of perforation clusters.

6. The method of claim 5, wherein outputting commands to adjust the completion operation with respect to the target wellbore includes generating the commands based on the estimated uniformity index for the second plurality of perforation clusters.

7. The method of claim 1, wherein the pressure-based model includes a pump-rate model, a diverter model, or a proppant model, wherein a pump rate of a completion operation is controllable by the pump-rate model, wherein an amount of diverter to drop with respect to the completion operation is controllable by the diverter model, and wherein a sand mixture used in the completion operation is controllable by the proppant model.

8. A non-transitory computer-readable medium comprising instructions that are executable by a processing device for causing the processing device to perform operations comprising:
receiving data from a fiber optic cable in a reference wellbore in a geographic area of interest, the data indicating a flow rate with respect to a plurality of perforation clusters in the reference wellbore;
determining a uniformity index for each perforation cluster of the plurality of perforation clusters based on the data, the uniformity index indicating a uniformity of flow for each perforation of each perforation cluster of the plurality of perforation clusters with respect to other perforation clusters included in the plurality of perforation clusters;
generating a pressure-based model by training a model using the uniformity index for applying the pressure-based model to a target wellbore in the geographic area of interest;
receiving data indicating pressure with respect to the target wellbore in the geographic area of interest;
applying the pressure-based model to the data indicating pressure with respect to the target wellbore to determine an estimated uniformity index of the target wellbore; and
outputting commands to adjust a completion operation with respect to the target wellbore based on the estimated uniformity index.

9. The non-transitory computer-readable medium of claim 8, wherein the data from the fiber optic cable includes a pump rate of the reference wellbore and a pressure of the reference wellbore usable for determining a flow distribution of the reference wellbore, and
wherein the operation of determining the uniformity index based on the data from the fiber optic cable includes using a coefficient of variation that is a standard deviation of the flow distribution of the reference wellbore divided by a mean of the flow distribution in the reference wellbore.

10. The non-transitory computer-readable medium of claim 9, wherein the pressure-based model is usable for controlling rate and proppant in the target wellbore without any fiber optic cable being present in the target wellbore.

11. The non-transitory computer-readable medium of claim 8,
wherein the operation of generating the pressure-based model includes training the pressure-based model using the uniformity index for each perforation cluster of the plurality of perforation clusters.

12. The non-transitory computer-readable medium of claim 11, wherein the operation of outputting commands to adjust the completion operation with respect to the target wellbore includes generating the commands based on the estimated uniformity index for the plurality of perforation clusters.

13. The non-transitory computer-readable medium of claim 8, wherein the pressure-based model includes a pump-rate model or a proppant model, wherein a pump rate of a completion operation is controllable by the pump-rate model, and wherein a sand mixture used in the completion operation is controllable by the proppant model.

14. The method of claim 1, wherein the uniformity index comprises a plurality of cluster uniformity indexes, and wherein each cluster uniformity index of the plurality of cluster uniformity indexes corresponds to a different perforation cluster of the plurality of perforation clusters.

* * * * *